United States Patent
Anderson et al.

(10) Patent No.: US 9,422,066 B2
(45) Date of Patent: Aug. 23, 2016

(54) GROUNDING SLEEVE

(71) Applicant: United Technologies Corporation, Hartford, CT (US)

(72) Inventors: Carney R. Anderson, East Haddam, CT (US); John C. Ditomasso, Glastonbury, CT (US)

(73) Assignee: United Technologies Corporation, Hartford, CT (US)

( * ) Notice: Subject to any disclaimer, the term of this patent is extended or adjusted under 35 U.S.C. 154(b) by 0 days.

(21) Appl. No.: 14/776,782

(22) PCT Filed: Mar. 10, 2014

(86) PCT No.: PCT/US2014/022724
§ 371 (c)(1),
(2) Date: Sep. 15, 2015

(87) PCT Pub. No.: WO2014/150253
PCT Pub. Date: Sep. 25, 2014

(65) Prior Publication Data
US 2016/0016673 A1      Jan. 21, 2016

Related U.S. Application Data

(60) Provisional application No. 61/793,294, filed on Mar. 15, 2013.

(51) Int. Cl.
| | |
|---|---|
| *B64D 45/02* | (2006.01) |
| *H02G 13/00* | (2006.01) |
| *H01R 4/30* | (2006.01) |
| *H01R 4/64* | (2006.01) |
| *F16B 19/02* | (2006.01) |
| *F16B 1/00* | (2006.01) |

(52) U.S. Cl.
CPC ............... *B64D 45/02* (2013.01); *H02G 13/40* (2013.01); *F16B 19/02* (2013.01); *F16B 2001/0064* (2013.01); *H01R 4/308* (2013.01); *H01R 4/64* (2013.01); *H01R 2201/26* (2013.01)

(58) Field of Classification Search
USPC .......................................... 174/200
See application file for complete search history.

(56) References Cited

U.S. PATENT DOCUMENTS

| | | | |
|---|---|---|---|
| 2,257,538 A | 9/1941 | Schlueter | |
| 4,244,661 A | 1/1981 | Dervy | |
| 4,718,801 A * | 1/1988 | Berecz ................... | B64D 45/02 411/378 |
| 4,755,904 A * | 7/1988 | Brick ..................... | B64D 45/02 244/1 A |

(Continued)

FOREIGN PATENT DOCUMENTS

| | | |
|---|---|---|
| EP | 1484245 A1 | 8/2004 |
| JP | 10014321 A | 1/1998 |
| KR | 1020110073180 A | 6/2011 |

OTHER PUBLICATIONS

Extended European Search Report, for European Patent Application No. 14769073.9, dated Mar. 2, 2016, 7 pages.

(Continued)

*Primary Examiner* — Dhirubhai R Patel
(74) *Attorney, Agent, or Firm* — Kinney & Lange, P.A.

(57) ABSTRACT

A grounding sleeve for grounding an electrically insulated element disposed between two metal components includes an annular body extending between a first end and a second end. At least one window is formed in the annular body between the first end and the second end.

15 Claims, 3 Drawing Sheets

(56) References Cited

U.S. PATENT DOCUMENTS

| | | | |
|---|---|---|---|
| 5,167,537 A | 12/1992 | Johnescu et al. | |
| 5,175,665 A * | 12/1992 | Pegg | B64D 45/02 244/1 A |
| 5,713,748 A | 2/1998 | Mulvihill | |
| 6,609,866 B2 | 8/2003 | Huang et al. | |
| 6,929,424 B2 | 8/2005 | Hindle | |
| D536,956 S | 2/2007 | Huang | |
| 7,277,292 B2 | 10/2007 | Barsun et al. | |
| 2007/0281517 A1 | 12/2007 | Bauer et al. | |

OTHER PUBLICATIONS

The International Search Report mailed Jun. 24, 2014 for International Application No. PCT/US2014/022724.

* cited by examiner

GROUNDING SLEEVE

CROSS-REFERENCE TO RELATED APPLICATION(S)

This application claims the benefit of PCT Application No. PCT/US2014/022724 filed Mar. 10, 2014, for "Grounding Sleeve" by Carney R. Anderson and John C. Ditomasso, and U.S. Provisional Application No. 61/793,294 filed Mar. 15, 2013, for "Grounding Sleeve" by Carney R. Anderson and John C. Ditomasso.

BACKGROUND

The present disclosure relates generally to reducing electromagnetic effects from lightning strikes to aircraft structures containing composite components and metal components.

Aircraft often incorporate composite components in the fan section and compressor sections of a gas turbine engine to decrease the weight of the aircraft. Decreasing the weight of the aircraft increases the fuel efficiency of the aircraft and its payload capacity. Composite components are generally made by combining and curing carbon fibers within a resin matrix. Some of these composite components are connected within the gas turbine engine through a flange configuration that bolts a composite component between two metal components. Typically, the outer surface of the composite component electrically insulates the composite component and the carbon fibers within the composite component from the metal components disposed on either side of the composite component.

Because the carbon fibers within the composite component are electrically conductive, it may be necessary to electrically ground the composite component to at least one of the neighboring metal components to protect the composite component against lighting strikes. Lighting strikes can cause the carbon fibers in an ungrounded composite component to heat up beyond the pyrolyzation temperature of the resin matrix. When the resin matrix surrounding the carbon fibers exceeds its pyrolyzation temperature, the resin matrix surrounding the carbon fibers transforms into a heated pressurized gas that may lead to delamination of the composite component. One method that is used to electrically ground the composite component to a neighboring metal component is to attach a metal rivet to the composite component and extend a wire from the rivet to the neighboring metal component. This method is disadvantageous as it requires additional hardware and requires drilling an additional hole in the composite component to house the rivet and put the rivet in contact with the carbon fibers. Another method that is used to electrically ground the composite component to the neighboring metal component is to strip the outer layer on the composite component to expose the carbon fibers. The neighboring metal component is stripped of any insulating coatings, and the stripped surface of the metal component is positioned against the stripped surface of the composite component. This method is disadvantageous as stripping the outer layer of the composite component may affect its durability. This method also is disadvantageous as stripping the insulating coatings from the metal component may induce corrosion of the metal component.

SUMMARY

According to the present invention, a grounding sleeve for grounding an electrically insulated element disposed between two metal components includes an annular body extending between a first end and a second end. At least one window is formed in the annular body between the first end and the second end.

In another embodiment of the present invention, an assembly includes a first metal component and a second metal component. A composite component is disposed between the first metal component and the second metal component. An electrically conductive element is disposed within the composite component. A hole extends through the first metal component and the composite component, and into the second metal component. A fastener is disposed in the hole and connects the first metal component, the second metal component and the composite component together. A sleeve is disposed in the hole and around the fastener. The fastener compresses the sleeve inside the hole such that the sleeve deflects and contacts the electrically conductive element while the sleeve maintains contact with the fastener, thereby forming a grounding path with the first metal component, the composite component, and the second metal component.

In another embodiment of the present invention, a method for grounding a composite component disposed between a first metal component and a second metal component includes inserting a fastener inside a sleeve. The fastener and the sleeve are inserted into a hole, the hole extending through the first metal component and the composite component, and into the second metal component. The fastener is tightened inside the hole to compress the sleeve and deflect the sleeve into contact with the composite component while the sleeve maintains contact with the fastener.

DETAILED DESCRIPTION

The present invention provides a grounding sleeve for grounding a composite component to an adjacent metal component that is bolted to the composite component. The grounding sleeve is disposed on the bolt and is inserted along with the bolt into a hole that extends through the composite component and the adjacent metal component. The grounding sleeve includes an elongated element that bows away from the bolt and into contact with the composite component inside the hole when the bolt is tightened. When the elongated element contacts the composite component in the hole the elongated element contacts carbon fibers inside the composite component. The grounding sleeve also continues to contact the bolt. Together, the grounding sleeve and the bolt provide a grounding path between the carbon fibers in the composite component and the adjacent metal component.

Figure 1:
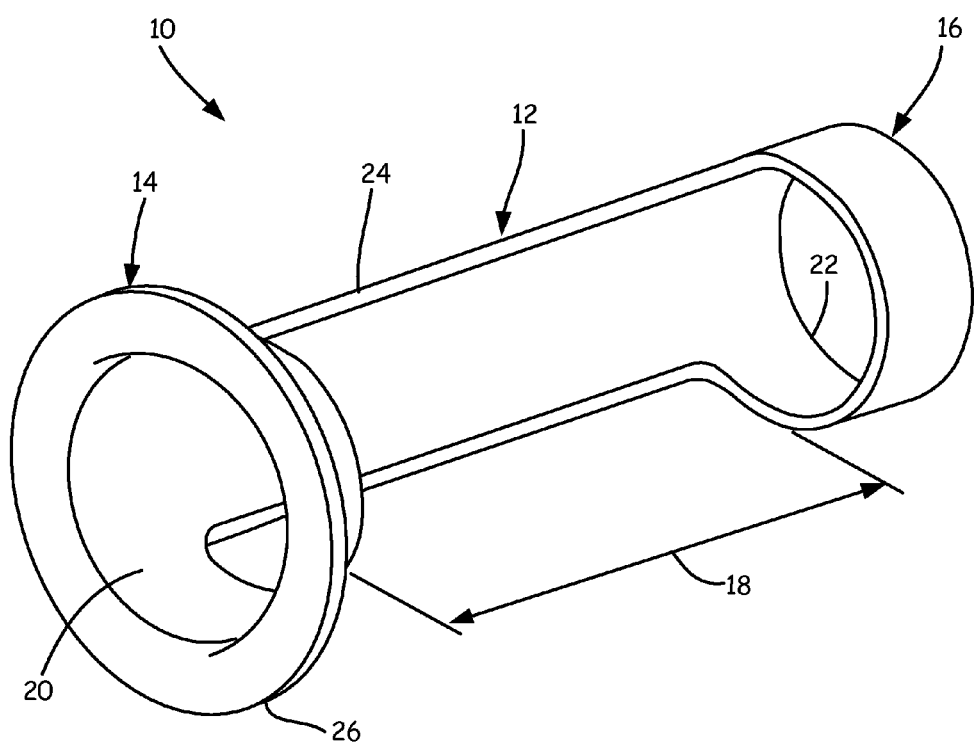
FIG. 1 is a perspective view of a grounding sleeve.

FIG. 1 is a perspective view of grounding sleeve 10 used for grounding a composite component. As shown in FIG. 1, grounding sleeve 10 includes annular body 12, first end 14, second end 16, window 18, first annular ring 20, second annular ring 22, thin elongated element 24, and flange 26.

Annular body 12 of grounding sleeve 10 extends between first end 14 and second end 16. Annular body 12 may be formed from a corrosion resistant alloy, such as nickel-chromium alloy. Window 18 is formed in annular body 12 between first end 14 and second end 16. In the embodiment of FIG. 1, window 18 extends circumferentially across more than half of a circumference of annular body 12, thereby forming thin elongated element 24 between first annular ring 20 disposed at first end 14, and second annular ring 22 disposed at second end 16 opposite first annular ring 20. Thin elongated element 24 and window 18 extend between first annular ring 20 and second annular ring 22 and space first annular ring 20 from second annular ring 22. As described below in the description of FIGS. 2-4, first annular ring 20 is coaxial with second annular ring 22 so that first annular ring 20 and second annular ring 22 may slide over bolt 38. Thin elongated element 24 is curved with a radius equal to a radius of first annular ring 20 and second annular ring 22 such that thin elongated element 24 is seamless with first annular ring 20 and second annular ring 22. Flange 26 is formed on first annular ring 20 at first end 14. As described below in the description of FIGS. 2-4, grounding sleeve 10 is placed on bolt 38 that connects composite component 34 to first metal component 30 and second metal component 32, and provides a grounding path from composite component 34 to first metal component 30 and second metal component 32.

Figure 2:
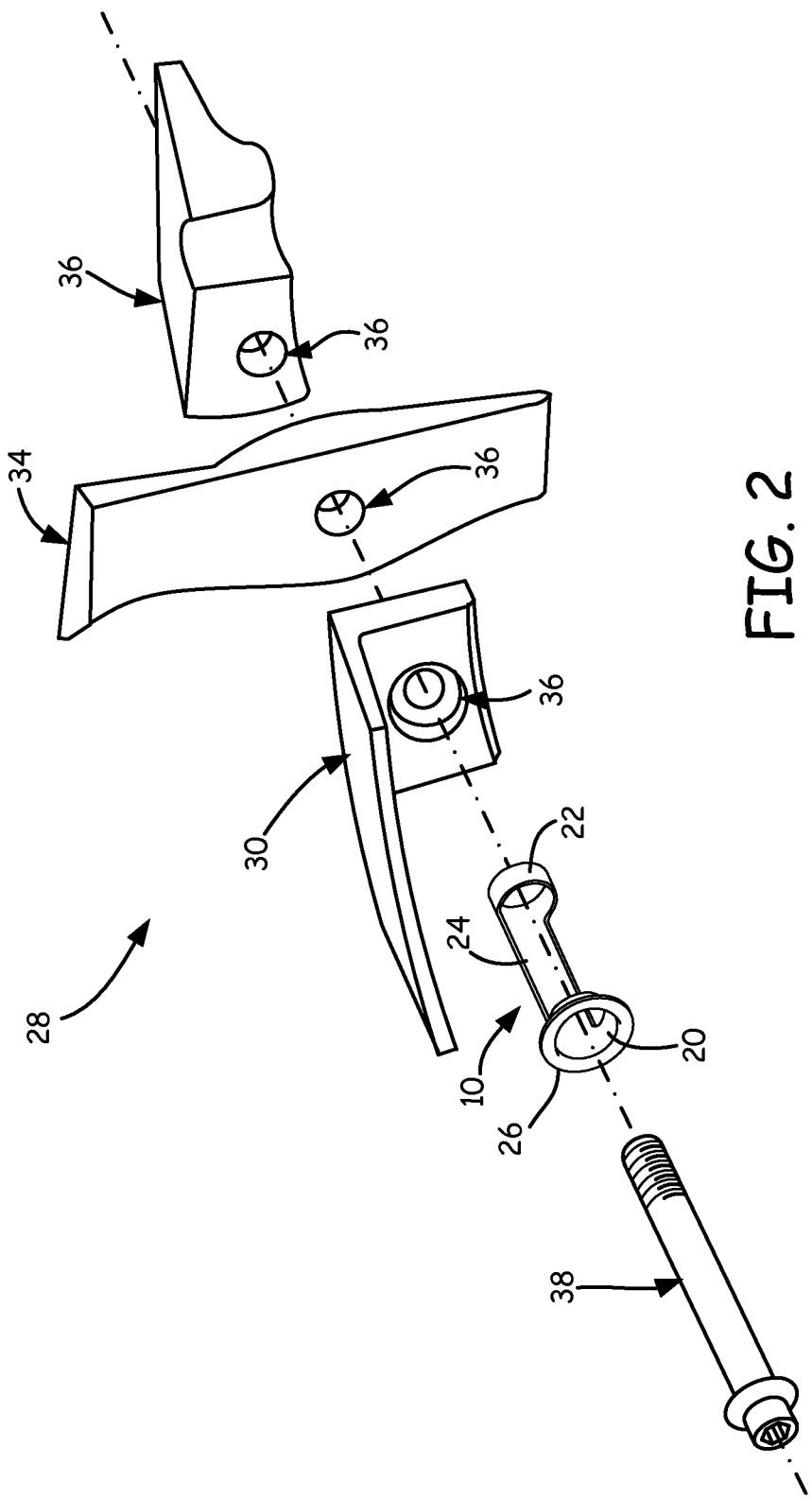
FIG. 2 is an exploded view of an assembly with the grounding sleeve from FIG. 1.
Figure 3:
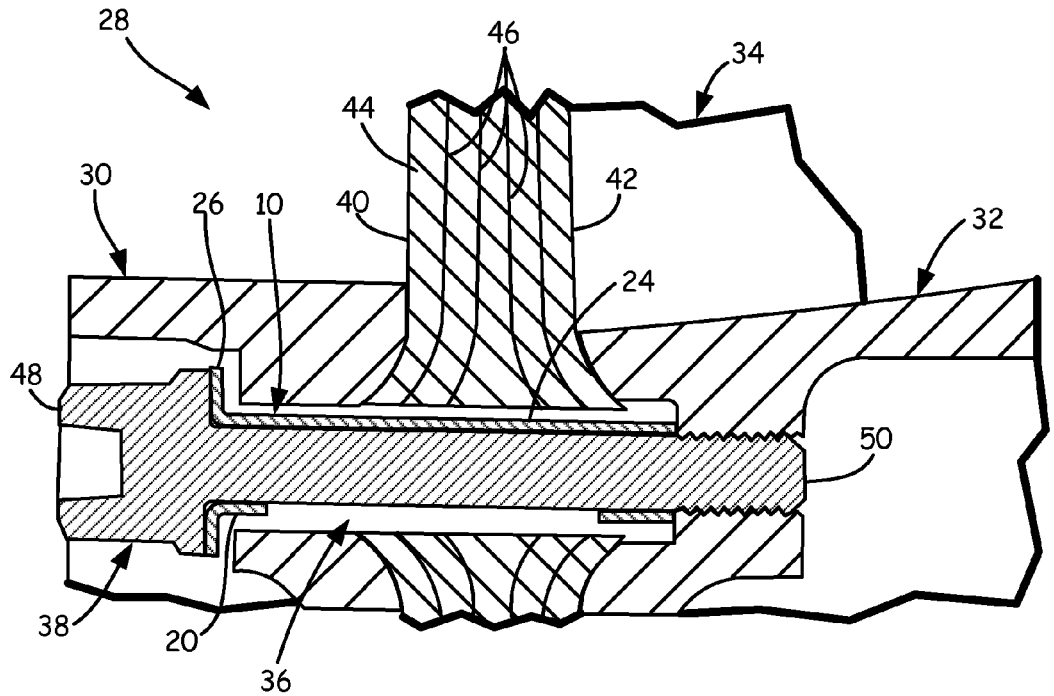
FIG. 3 is a cross-sectional view of the assembly from FIG. 2.
Figure 4:
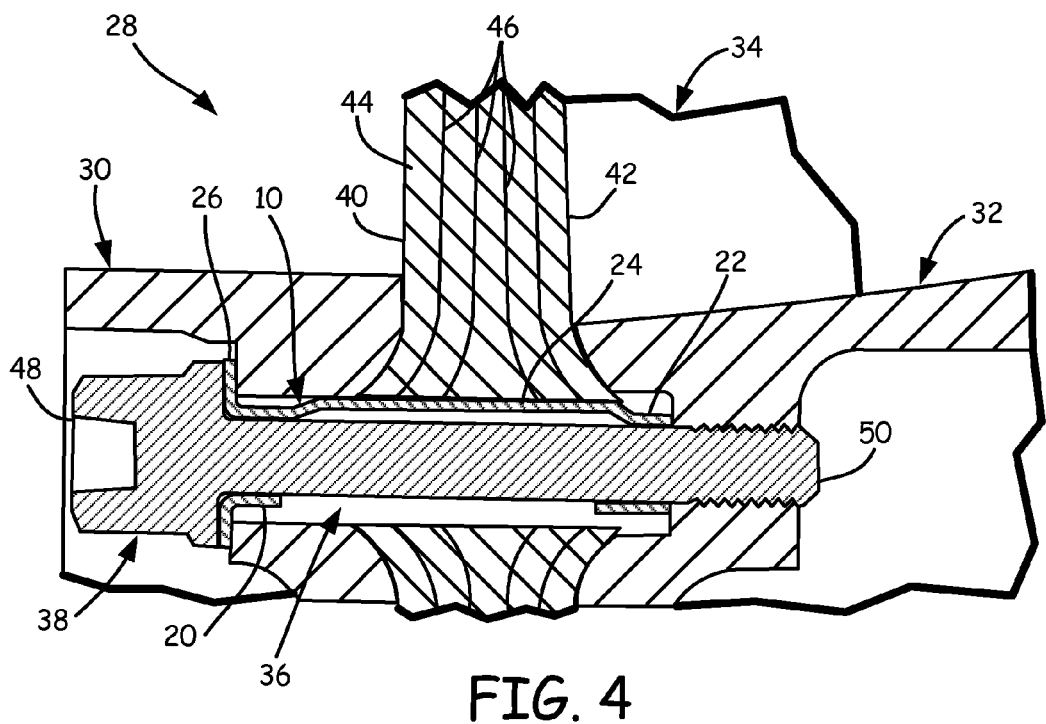
FIG. 4 is another cross-sectional view of the assembly from FIG. 2.

FIGS. 2-4 will now be discussed concurrently. FIG. 2 is an exploded view of assembly 28 that incorporates grounding sleeve 10 from FIG. 1. FIGS. 3 and 4 are cross-sectional views of assembly 28 from FIG. 2. As shown in FIGS. 2-4, assembly 28 includes grounding sleeve 10, first metal component 30, second metal component 32, composite component 34, hole 36, and bolt 38. Grounding sleeve 10 includes first annular ring 20, second annular ring 22, thin elongated element 24, and flange 26. Composite component 34 includes first side 40, second side 42, resin matrix 44, and carbon fibers 46. Bolt 38 includes first end 48 and second end 50.

In FIGS. 2-4, components of like numbering with the components of FIG. 1 are assembled as discussed above with reference to FIG. 1. Composite component 34 is disposed between first metal component 30 and second metal component 32. First metal component 30 contacts first side 40 of composite component 34; second metal component 32 contacts second side 42 of composite component 34. Carbon fibers 46 are disposed inside composite component 34 within resin matrix 44. Carbon fibers 46 are electrically conductive, and resin matrix 44 electrically insulates carbon fibers 46 from electrically communicating with first metal component 30 through first side 40 of composite component 34. Resin matrix 44 also electrically insulates carbon fibers 46 from electrically communicating with second metal component 32 through second side 42 of composite component 34. Hole 36 extends through first metal component 30 and composite component 34, and extends into second metal component 32. As hole 36 extends through composite component 34, hole 36 exposes carbon fibers 46. Bolt 38 is inserted into first annular ring 20 and second annular ring 22 of grounding sleeve 10. Bolt 38 and grounding sleeve 10 are inserted into hole 36 to connect first metal component 30, composite component 34, and second metal component 32 together. Second end 50 of bolt 38 may be threaded into second metal component 32.

Grounding sleeve 10 is longer than hole 36, and when bolt 38 is tightened inside hole 36, first end 48 of bolt 38 and second metal component 32 compress grounding sleeve 10 inside hole 36. As bolt 38 and second metal component 32 compress grounding sleeve 10, thin elongated element 24 deflects, bows out from bolt 38, and contacts carbon fibers 46 of composite component 34. First annual ring 20 and second annular ring 22 are nominally sized to a diameter of bolt 38 to ensure that thin elongated element 24 bows out from bolt 38 and to prevent thin elongated element 24 from bowing inward towards bolt 38. Thin elongated element 24 may also contact first metal component 30 and second metal component 32 as it bows out from bolt 38. As thin elongated element 24 deflects into contact with carbon fibers 46 of composite component 34, first annular ring 20 and second annular ring 22 maintain contact between grounding sleeve 10 and bolt 38. Flange 26 on first annular ring 20 is disposed between first end 48 of bolt 38 and first metal component 30 and physically contacts both bolt 38 and first metal component 30. Because grounding sleeve 10 is compressed between first end 48 of bolt 38 and second metal component 32, second annular ring 22 is pressed against and physically maintains contact with second metal component 32. As second annular ring 22 is disposed around bolt 38, second annular ring 22 also maintains physical contact with bolt 38. Bolt 38 maintains contact with second metal component 32 since bolt 38 is threadingly connected to second metal component 32. Because grounding sleeve 10 contacts first metal component 30 and second metal component 32, both directly and indirectly through bolt 48, while grounding sleeve 10 contacts carbon fibers 46, grounding sleeve 10 forms an electrical grounding path from composite component 34 to first metal component 30 and second metal component 32. In the event assembly 28 is struck by lighting, electrical energy is dissipated from carbon fibers 48 into first metal component 30 and second metal component 32 via grounding sleeve 10.

In view of the foregoing description, it will be recognized that the present disclosure provides numerous advantages and benefits. For example, the present disclosure provides grounding sleeve 10 with first annular ring 20, second annular ring 22, and thin elongated element 24. Grounding sleeve 10 is inserted inside hole 36 that is used to connect composite component 34 between first metal component 30 and second metal component 32. Grounding sleeve 10 provides an electrical grounding path from composite component 34 to first metal component 30 and second metal component 32 without modifying or compromising the integrity of composite component 34, first metal component 30, or second metal component 32. Grounding sleeve 10 is also simple in design, relatively inexpensive, and can be incorporated in already existing metal-composite assemblies with little-to-no modification to the assemblies.

Discussion of Possible Embodiments

The following are non-exclusive descriptions of possible embodiments of the present invention.

In one embodiment, an assembly includes a first metal component and a second metal component. A composite component is disposed between the first metal component and the second metal component. An electrically conductive element is disposed within the composite component. A hole extends through the first metal component and the composite component, and into the second metal component. A fastener is disposed in the hole and connects the first metal component, the second metal component and the composite component together. A sleeve is disposed in the hole and around the fastener. The fastener compresses the sleeve inside the hole such that the sleeve deflects and contacts the electrically conductive element while the sleeve maintains contact with the fastener, thereby forming a grounding path with the first metal component, the composite component, and the second metal component.

The assembly of the preceding paragraph can optionally include, additionally and/or alternatively, any one or more of the following features, configurations and/or additional components:

wherein the sleeve in an undeflected state is longer than the hole;

wherein the composite component electrically insulates the electrically conductive element from the first metal component and the second metal component, and the hole exposes the electrically conductive element;

wherein the sleeve includes a first annular ring, a second annular ring disposed opposite the first annular ring and spaced from the first annular ring, and a thin elongated element extending from the first annular ring to the second annular ring;

wherein the first annular ring is coaxial with the second annular ring;

wherein the thin elongated element is curved with a radius equal to a radius of the first annular ring and a radius of the second annular ring;

wherein the first annular ring contacts the first metal component and the fastener;

wherein the second annular ring contacts the second component and the fastener;

wherein the thin elongated element deflects and contacts the electrically conductive element disposed inside the composite component;

wherein the thin elongated element bows out from the fastener into contact with the electrically conductive element; and/or wherein the thin elongated element bows out from the fastener into contact with the electrically conductive element, the first metal component, and the second metal component.

In another embodiment, a method for grounding a composite component disposed between a first metal component and a second metal component includes inserting a fastener inside a sleeve. The fastener and the sleeve are inserted into a hole, the hole extending through the first metal component and the composite component, and into the second metal component. The fastener is tightened inside the hole to compress the sleeve and deflect the sleeve into contact with the composite component while the sleeve maintains contact with the fastener.

In yet another embodiment, a grounding sleeve for grounding an electrically insulated element disposed between two metal components includes an annular body extending between a first end and a second end. At least one window is formed in the annular body between the first end and the second end.

The grounding sleeve of the preceding paragraph can optionally include, additionally and/or alternatively, any one or more of the following features, configurations and/or additional components:

wherein the annular body includes a flange disposed at the first end;

wherein the at least one window extends across more than half of a circumference of the annular body; and/or wherein the annular body is formed from a nickel-chromium alloy.

While the invention has been described with reference to an exemplary embodiment(s), it will be understood by those skilled in the art that various changes may be made and equivalents may be substituted for elements thereof without departing from the scope of the invention. For example, while the specification describes grounding sleeve 10 as including one thin elongated element 24 and one window 18, grounding sleeve 10 may include multiple thin elongated elements 24 and multiple windows 18. Additionally, while the specification describes grounding sleeve 10, a fastener collar could include thin elongated element 24 and could be used in place of grounding sleeve 10 without departing from the essential scope of the invention. Furthermore, while the specification describes bolt 38 as connecting composite component 34, first metal component 30, and second metal component 32 together, any fastener capable of fitting within hole 36 and connecting assembly 28 together could be used without departing from the essential scope of the invention. Examples of fasteners that could be used in place of bolt 38 include rivets, machine screws, or pins. In addition, many modifications may be made to adapt a particular situation or material to the teachings of the invention without departing from the essential scope thereof. For example, while the invention has been described as being applied in the fan section or compressor sections of a gas turbine engine in an aircraft, the invention may be used in other areas of an aircraft, or in applications outside of aerospace where it is necessary to provide a grounding path between a composite component and a metal component. Therefore, it is intended that the invention not be limited to the particular embodiment(s) disclosed, but that the invention will include all embodiments falling within the scope of the appended claims.

The invention claimed is:

1. An assembly comprising:
a first metal component;
a second metal component;
a composite component disposed between the first metal component and the second metal component, the composite component comprising:
an electrically conductive element disposed within the composite component;
a hole extending through the first metal component and the composite component, and into the second metal component;
a fastener disposed in the hole and connecting the first metal component, the second metal component and the composite component together; and
a sleeve disposed in the hole and around the fastener, wherein the fastener compresses the sleeve inside the hole such that the sleeve deflects and contacts the electrically conductive element while the sleeve maintains contact with the fastener, thereby forming a grounding path with the first metal component, the composite component, and the second metal component, wherein the sleeve comprises:
a first annular ring;
a second annular ring disposed opposite the first annular ring and spaced from the first annular ring; and
a thin elongated element extending from the first annular ring to the second annular ring.

2. The assembly of claim 1, wherein the sleeve in an undeflected state is longer than the hole.

3. The assembly of claim 1, wherein the composite component electrically insulates the electrically conductive element from the first metal component and the second metal component, and the hole exposes the electrically conductive element.

4. The assembly of claim 1, wherein the first annular ring is coaxial with the second annular ring.

5. The assembly of claim 4, wherein the thin elongated element is curved with a radius equal to a radius of the first annular ring and a radius of the second annular ring.

6. The assembly of claim 1, wherein the first annular ring contacts the first metal component and the fastener.

7. The assembly of claim 1, wherein the second annular ring contacts the second component and the fastener.

8. The assembly of claim 1, wherein the thin elongated element deflects and contacts the electrically conductive element disposed inside the composite component.

9. The assembly of claim 8, wherein the thin elongated element bows out from the fastener into contact with the electrically conductive element.

10. The assembly of claim 8, wherein the thin elongated element bows out from the fastener into contact with the electrically conductive element, the first metal component, and the second metal component.

11. A method for grounding a composite component disposed between a first metal component and a second metal component, the method comprising:
- inserting a fastener inside a sleeve, wherein the sleeve comprises a first annular ring, a second annular ring disposed opposite the first annular ring and spaced from the first annular ring, and a thin elongated element extending from the first annular ring to the second annular ring;
- inserting the fastener and the sleeve into a hole extending through the first metal component and the composite component, and into the second metal component; and
- tightening the fastener inside the hole to compress the sleeve and deflect the sleeve into contact with the composite component while the sleeve maintains contact with the fastener, thereby forming a grounding path with the first metal component, the composite component, and the second metal component.

12. An assembly comprising:
- a first metal component;
- a second metal component;
- a composite component disposed between the first metal component and the second metal component, the composite component comprising:
  - an electrically conductive element disposed within the composite component;
- a hole extending through the first metal component and the composite component, and into the second metal component;
- a fastener disposed in the hole and connecting the first metal component, the second metal component and the composite component together; and
- a sleeve disposed in the hole and around the fastener, wherein the fastener compresses the sleeve inside the hole such that the sleeve deflects and contacts the electrically conductive element while the sleeve maintains contact with the fastener, thereby forming a grounding path with the first metal component, the composite component, and the second metal component, wherein the sleeve comprises:
  - an annular body extending between a first end and a second end; and
  - at least one window formed in the annular body between the first end and the second end.

13. The assembly of claim 12, wherein the annular body includes a flange disposed at the first end.

14. The assembly of claim 12, wherein the at least one window extends across more than half of a circumference of the annular body.

15. The assembly of claim 12, wherein the annular body is formed from a nickel-chromium alloy.

* * * * *